US012645616B1

(12) United States Patent
Gage et al.

(10) Patent No.: US 12,645,616 B1
(45) Date of Patent: Jun. 2, 2026

(54) HARDWARE MULTIPLEXED MEMORY FOR UNIDIRECTIONAL DATA TRANSFER

(71) Applicant: The United States of America, as represented by the Secretary of the Navy, Arlington, VA (US)

(72) Inventors: Christopher Paul Gage, San Diego, CA (US); Peter Thomas Sullivan, Encinitas, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 18/912,437

(22) Filed: Oct. 10, 2024

(51) Int. Cl.
| | |
|---|---|
| *G06F 13/16* | (2006.01) |
| *G01W 1/00* | (2006.01) |
| *G01W 1/02* | (2006.01) |
| *G06F 13/42* | (2006.01) |

(52) U.S. Cl.
CPC ........... *G06F 13/1684* (2013.01); *G01W 1/02* (2013.01); *G06F 13/4282* (2013.01); *G01W 2001/006* (2013.01); *G06F 2213/16* (2013.01)

(58) Field of Classification Search
CPC .............................. G06F 13/4282; G01S 19/37
See application file for complete search history.

(56) References Cited

U.S. PATENT DOCUMENTS

| | | | |
|---|---|---|---|
| 11,061,670 | B2 | 7/2021 | Yang et al. |
| 11,256,651 | B2 | 2/2022 | Abdul Kalam et al. |
| 11,288,215 | B2 | 3/2022 | Marcoccia et al. |
| 2005/0050282 | A1* | 3/2005 | Vantalon ................. G01S 19/37 |
| | | | 711/170 |
| 2016/0292109 | A1* | 10/2016 | Schumacher ....... G06F 13/1673 |
| 2022/0206717 | A1* | 6/2022 | Kim ...................... G11C 29/022 |
| 2023/0126961 | A1* | 4/2023 | Leong ..................... G06F 21/72 |
| | | | 713/171 |
| 2023/0161598 | A1* | 5/2023 | Lee ........................ G06F 9/4416 |
| | | | 713/2 |
| 2025/0123991 | A1* | 4/2025 | Narayanasamy ... G06F 13/4282 |

OTHER PUBLICATIONS

NXP Semiconductors, Data Sheet, "i.MX RT1060 Crossover Processors for Industrial Products", Document No. IMXRT1060IEC, Rev. 4, Apr. 2024.
AP Memory, APS6404L-3SQR QSPI PSRAM, "SPI/QPI PSRAM", APM SPI 3V PSRAM Datasheet, Rev. 2.3, Apr. 30, 2020.

(Continued)

*Primary Examiner* — Getente A Yimer
(74) *Attorney, Agent, or Firm* — Naval Information Warfare Center, Pacific; Kyle Eppele; Paul C. Oestreich

(57) ABSTRACT

The present invention involves hardware multiplexed memory for unidirectional data transfer circuits, systems and methods. The invention is useful for gathering data at a primary processor and efficiently transferring that data to a secondary processor using Quad Serial Peripheral Interface (QSPI) protocol. The hardware multiplexed memory circuit may include two 6-channel 2-1 multiplexers and two QSPI random access memories interfacing between the two processors. The invention has numerous embedded system applications including, e.g., Internet of Things (IoT) trail cam systems and IoT weather monitors.

16 Claims, 6 Drawing Sheets

(56)            References Cited

OTHER PUBLICATIONS

Texas Instruments, Inc., Application Brief, "Enabling SPI-Based Flash Memory Expansion by Using Multiplexers", SCDA016B, Jan. 2019, Revised Oct. 2021.
Texas Instruments, Inc., "TS3A27518E 6-Channel (qSPI), 1:2 Multiplexer and Demultiplexer with Integrated IEC L-4 ESD, and 1.8-V . . . ",SCDS260F, Mar. 2009, Revised Dec. 2021.
Wikipedia, "Serial Peripheral Interface"; <https://en.wikipedia.org/wiki/Serial_Peripheral_Interface>.

* cited by examiner

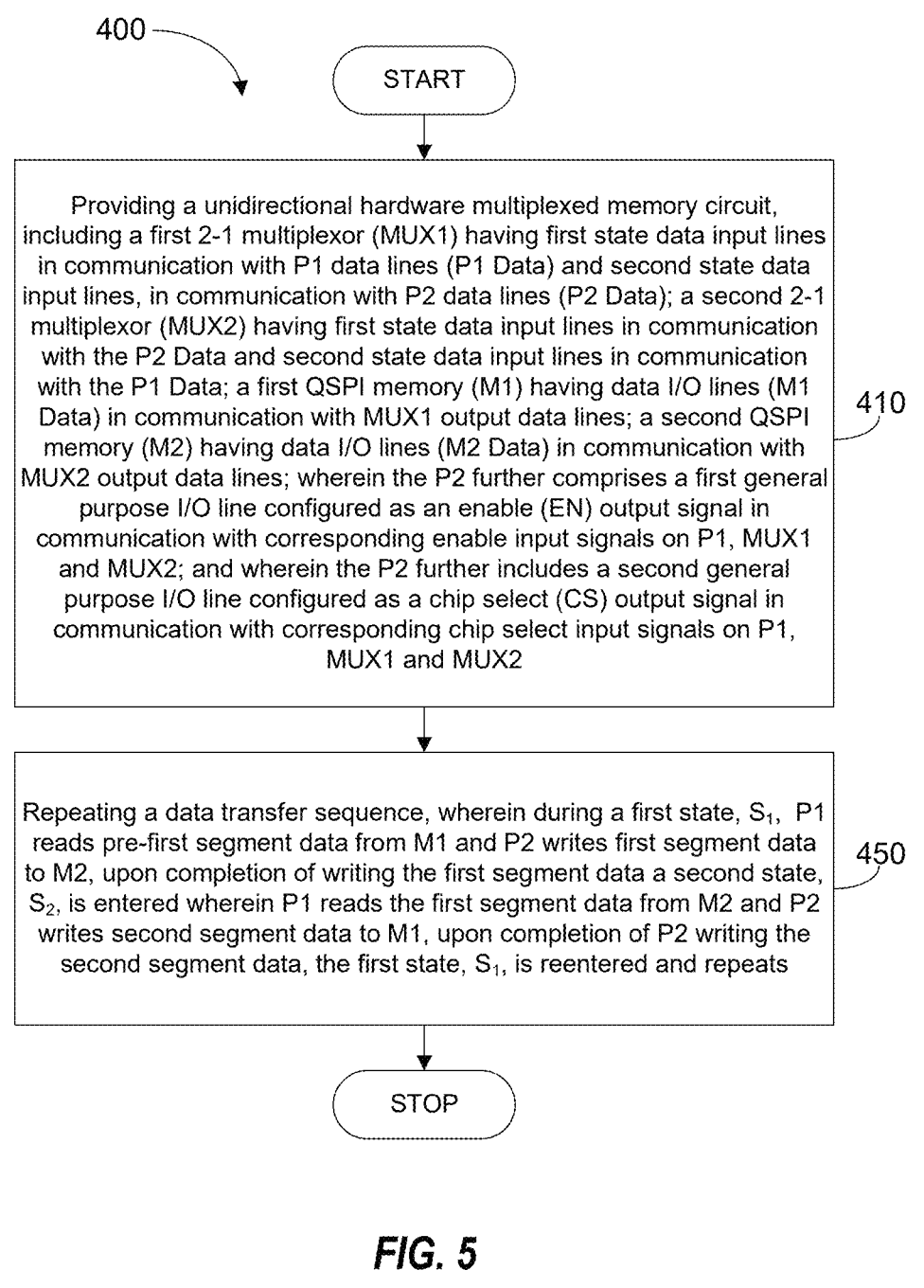

400 —

START

Providing a unidirectional hardware multiplexed memory circuit, including a first 2-1 multiplexor (MUX1) having first state data input lines in communication with P1 data lines (P1 Data) and second state data input lines, in communication with P2 data lines (P2 Data); a second 2-1 multiplexor (MUX2) having first state data input lines in communication with the P2 Data and second state data input lines in communication with the P1 Data; a first QSPI memory (M1) having data I/O lines (M1 Data) in communication with MUX1 output data lines; a second QSPI memory (M2) having data I/O lines (M2 Data) in communication with MUX2 output data lines; wherein the P2 further comprises a first general purpose I/O line configured as an enable (EN) output signal in communication with corresponding enable input signals on P1, MUX1 and MUX2; and wherein the P2 further includes a second general purpose I/O line configured as a chip select (CS) output signal in communication with corresponding chip select input signals on P1, MUX1 and MUX2

410

Repeating a data transfer sequence, wherein during a first state, $S_1$, P1 reads pre-first segment data from M1 and P2 writes first segment data to M2, upon completion of writing the first segment data a second state, $S_2$, is entered wherein P1 reads the first segment data from M2 and P2 writes second segment data to M1, upon completion of P2 writing the second segment data, the first state, $S_1$, is reentered and repeats

450

STOP

*FIG. 5*

HARDWARE MULTIPLEXED MEMORY FOR UNIDIRECTIONAL DATA TRANSFER

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211632.

BACKGROUND OF THE INVENTION

Field of the Invention: The present invention relates generally to embedded computer systems. More particularly, the present invention relates to unidirectional data transfer between processors.

Description of Related Art: Computer systems rely on the ability to move data between processors for manipulation and memory for storage. There are a variety of communication protocols that can be employed for moving data between such processors or microcontrollers. Generally speaking, communication protocols between microcontrollers generally fall into two categories: slower serial/parallel protocols operating at less than 10 Megabits per second (Mbps), e.g., Serial Peripheral Interface (SPI), Inter-Integrated Circuit (I2C), etc., and faster, more complicated communications protocols, e.g., Universal Serial Bus (USB), Ethernet, etc., which may operate at 1 Gigabit per second (Gbps) or more.

When data must be transferred at intermediate bit rates, e.g., between 10 Mbps and 512 Mbps, the added complexity, power, and overhead of using USB or Ethernet may be expensive and difficult to implement. Additionally, the full capabilities of such high-speed data communication protocols may not be required for some applications, particularly embedded systems. Accordingly, it would be useful to have data transfer capability in the intermediate range with minimal runtime overhead.

In view of the foregoing and for other reasons that will become evident through this disclosure, there exists a need in the art for improved data transfer solutions between processors with low overhead that may be used in any suitable application including embedded computer systems.

SUMMARY OF THE INVENTION

An embodiment of a circuit for unilaterally transferring data to a secondary processor (P1) from a primary processor (P2), both of the processors, P1 and P2, supporting data transfer using Quad Serial Peripheral Interface (QSPI) protocol, wherein the P1 includes four data input/output (I/O) lines (P1 Data) and the P2 also includes four data I/O lines (P2 Data) is disclosed. The embodiment of the circuit may include a first 2-1 multiplexer (MUX1) having first state data input lines in communication with the P1 Data and second state data input lines, in communication with the P2 Data; a second 2-1 multiplexer (MUX2) having first state data input lines in communication with the P2 Data and second state data input lines in communication with the P1 Data; a first memory (M1) having data I/O lines (M1 Data) in communication with output data lines of the MUX1; and a second memory (M2) having data I/O lines (M2 Data) in communication with output data lines of the MUX2, wherein the M1 and the M2 also support data transfer using the QSPI protocol.

An embodiment of a trail camera ("trail cam") system is disclosed. The embodiment of a trail cam system may include a movement detector and image/video capture module (P2) configured for placement at a remote location near a trail, and configured for sensing movement within a field of view and capturing images and/or video corresponding to the movement within the field of view; a radio-enabled module (P1) configured for transmitting the captured images and/or the captured video to a remote trail monitoring station; and a circuit for unilaterally transferring data from the P2 to the P1, wherein both the P1 and the P2 support data transfer using Quad Serial Peripheral Interface (QSPI) protocol, the P1 comprises four data input/output (I/O) lines (P1 Data) and the P2 further comprises four data I/O lines (P2 Data).

An embodiment of a remote weather monitoring system is disclosed. The embodiment of a remote weather monitoring system may include a weather station data gathering module (P2) comprising weather sensors configured for placement at a preselected location, and configured for periodically gathering weather data sensed at the preselected location; a radio-enabled module (P1) configured for transmitting the weather data to a remote weather monitoring station; and a circuit for unilaterally transferring the weather data from the P2 to the P1, wherein both the P1 and the P2 support data transfer using Quad Serial Peripheral Interface (QSPI) protocol, the P1 comprises four data input/output (I/O) lines (P1 Data) and the P2 further comprises four data I/O lines (P2 Data).

An embodiment of a method for unilaterally transferring data to a secondary processor (P1) from a primary processor (P2), wherein both of the processors, P1 and P2, support data transfer using Quad Serial Peripheral Interface (QSPI) protocol is disclosed. The method embodiment may include providing a unidirectional hardware multiplexed memory circuit. The unidirectional hardware multiplexed memory circuit embodiment may include a first 2-1 multiplexer (MUX1) having first state data input lines in communication with P1 data lines (P1 Data) and second state data input lines, in communication with P2 data lines (P2 Data); a second 2-1 multiplexer (MUX2) having first state data input lines in communication with the P2 Data and second state data input lines in communication with the P1 Data; a first QSPI memory (M1) having data I/O lines (M1 Data) in communication with MUX1 output data lines; a second QSPI memory (M2) having data I/O lines (M2 Data) in communication with MUX2 output data lines; wherein the P2 further comprises a first general purpose I/O line configured as an enable (EN) output signal in communication with corresponding enable input signals on the P1, the MUX1 and the MUX2; and wherein the P2 further includes a second general purpose I/O line configured as a chip select (CS) output signal in communication with corresponding chip select input signals on the P1, the MUX1 and the MUX2. The method embodiment may further include repeating a data transfer sequence, wherein during a first state, S1, the P1 reads pre-first segment data from the M1 and the P2 writes first segment data to the M2, upon the P2 completing writing the first segment data, P2 initiating a second state, S2, during which the P1 reads the first segment data from the M2 and the P2 writes second segment data to the M1, upon completion of the P2 writing the second segment data, reverting back to the first state, S1, and repeating the data transfer sequence from the first state, S1.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 5 is a flowchart of an embodiment of a method for unilaterally transferring data to a secondary processor (P1) from a primary processor (P2), wherein both of the processors, P1 and P2, support data transfer using Quad Serial Peripheral Interface (QSPI) protocol, according to the present invention.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment but may be expanded for use with any of the other methods, apparatuses and systems described herein as will be understood by one of ordinary skill in the art unless specifically otherwise stated.

The present invention is directed to data transfer between processors employing the Quad Serial Peripheral Interface (QSPI) protocol, a SPI protocol variant. More particularly, QSPI is an enhancement of the standard SPI protocol that provides up to four times the data throughput at higher frequencies while maintaining the compact form factor of the standard SPI protocol. A particularly useful feature of the present invention is the incorporation of hardware multiplexed memory, for example and not by way of limitation, QSPI enabled random access memory (RAM), associated with each of the processors. This feature allows data to be swapped from the first processor's memory to the second processor's memory without interaction from the second processor. A description of a specific embodiment of the present invention follows.

Figure 1:
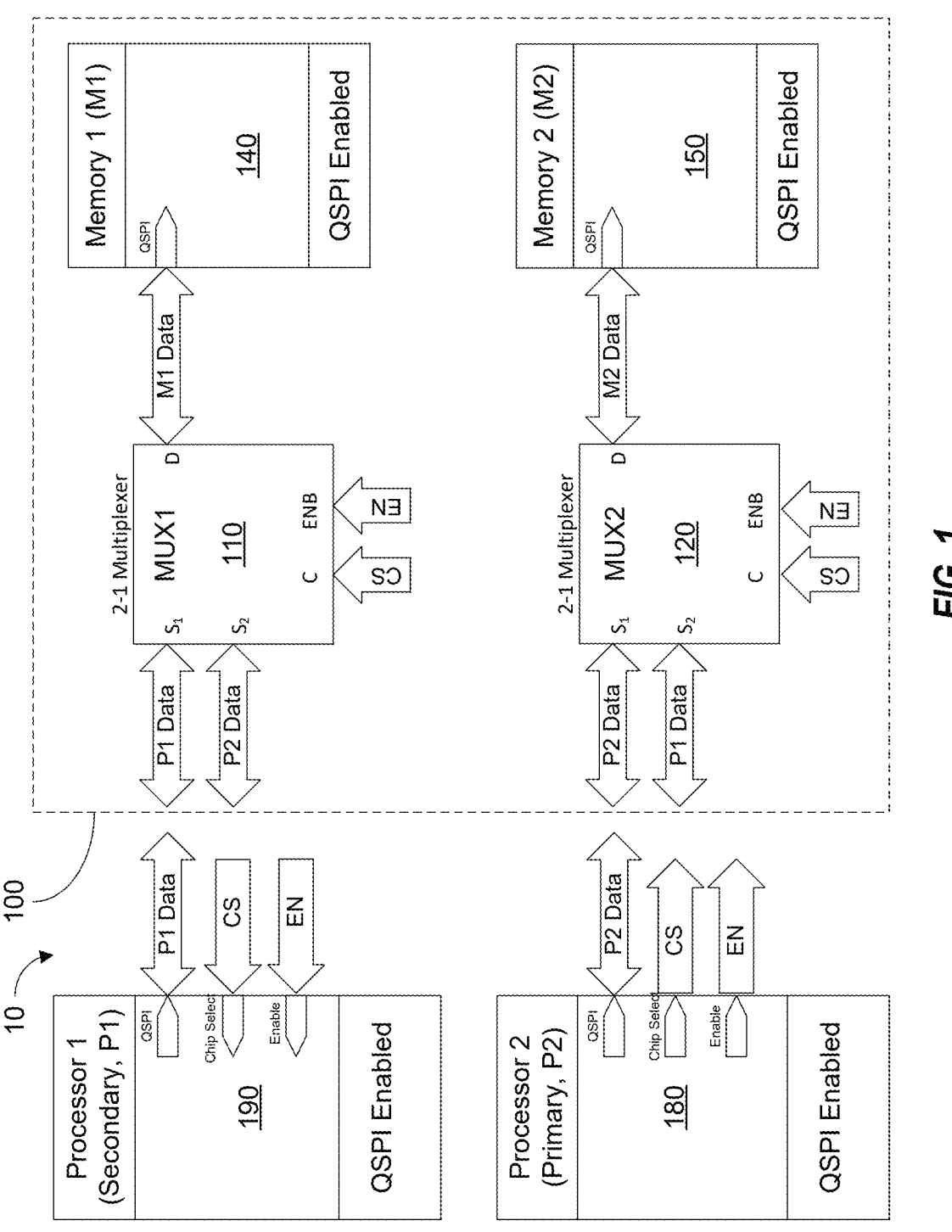
FIG. 1 is a block diagram of an embodiment of a system for unidirectional data transfer between processors including an embodiment of a hardware multiplexed memory, according to the present invention.

FIG. 1 is a block diagram of an embodiment of a system 10 for unidirectional data transfer between processors including an embodiment of a hardware multiplexed memory 100, according to the present invention. More particularly, FIG. 1 illustrates processor 2, also referred to herein as "primary processor" or "P2" and with reference 180. FIG. 1 also illustrates processor 1, also referred to herein as "secondary processor" or "P1", and with reference 190. Both processors P1 190 and P2 180 support data transfer using the QSPI protocol and may each include general purpose I/O lines that are configured as 4 QSPI data I/O pins, a chip select (CS) pin and an enable pin (EN). The terms "pin", "line" and "signal" may be used synonymously herein. It will be understood that processors P1 190 and P2 180 may be any suitable hardware and/or software supporting QSPI protocol for data transfer. For example, and not by way of limitation, processors P1 190 and P2 180 may be one of a microcontroller unit (MCU), a field programmable gate array (FPGA), a complex programmable logic device (CPLD), a central processing unit (CPU), a microprocessor, and an application specific integrated circuit (ASIC). For a particular example, and not by way of limitation, processors P1 190 and P2 180 may be a MCU having part number iMXRT1062 available from NXP Semiconductors, Austin, TX.

The embodiment of a hardware multiplexed memory, shown enclosed within dashed line box 100 in FIG. 1, may further include two multiplexers MUX1 110 and MUX2 120, each in communication with an associated memory M1 140 and M2 150, respectively. Each of the two multiplexers, MUX1 110 and MUX2 120 are 2-1 multiplexers with one of two data line channels, $S_1$ and $S_2$, selectable based on the state of the C pin as driven by a CS signal from the primary processor P2 180. In this way, either channel, $S_1$ or $S_2$, may be selected for connection to a single data channel, D, in communication with an associated memory M1 140 and M2 150. For example, and not by way of limitation, a particular example of a multiplexer that may be suitable for use as either MUX1 110 or MUX2 120 may be a 6-channel, 2-1 multiplexer and demultiplexer having part number TS3A27518E available from Texas Instruments, Dallas, TX.

Memories M1 140 and M2 150 are both configured for data transfer using the QSPI protocol (as indicated by the "QSPI enabled" labels), just like processors P1 190 and P2 180. Each output data channel, D, from the two multiplexers, MUX1 110 and MUX2 120 are connected to the associated memories M1 140 and M2 150 via QSPI pins. Those data connection lines are shown in FIG. 1 as M1 Data and M2 Data, respectively. For example, and not by way of limitation, a particular example of a QSPI enabled memory suitable for use as memory M1 140 or M2 150, may be QSPI RAM memory having part number APS6404L available from AP Memory, Zhubei City, Taiwan.

Processor P2 180 acts as the primary processor in the circuit embodiment illustrated in FIG. 1. Accordingly, P2 180 drives and controls chip select (CS) and enable (EN) signals on the multiplexers MUX1 110 and MUX2 120 as well as secondary processor P1 190, as shown in FIG. 1. The P1 Data lines from processor P1 190 are connected to the first state data line channel, $S_1$, of multiplexer MUX1 and the second state data line channel, $S_2$, of multiplexer MUX2. In contrast, the P2 Data lines from processor P2 180 are connected to first state data line channel, $S_1$, of multiplexer MUX2 and second state data line channel, $S_2$, of multiplexer MUX1. This cross-connection of the data lines, or "architectural feature" of hardware multiplexed memory 100 provides the efficient memory swapping of the present invention.

Figure 2:
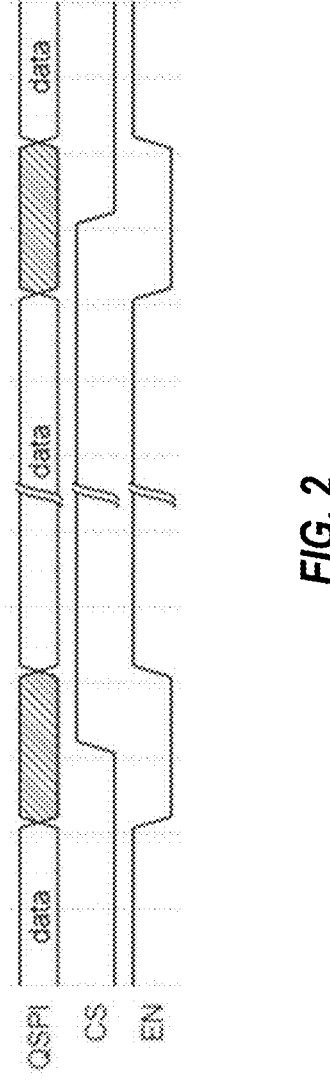
FIG. 2 is a timing diagram for the system including hardware multiplexed memory for unilateral data transfer, according to the present invention.

FIG. 2 is a timing diagram for the system 10 including hardware multiplexed memory 100 for unilateral data transfer, according to the present invention. Initially, a first data segment is being written by P2 and a prior data segment is being read by P1 from their respective memories M2 and M1. When P2 finishes writing the first data segment, P2 de-asserts the EN signal to disable P1, MUX1 and MUX2. Then P2 changes the CS signal to its complement to switch which memory is connected to which processor. Finally, P2 asserts the EN signal to reenable P1, MUX1 and MUX2. In this second state, $S_2$, P2 can write a second segment of data to M1, and at the same time P1 can now read the first data segment from M2. After P2 is finished writing its second data segment to M1, the sequence repeats by reverting back to the first state, $S_1$.

The hardware multiplexed memory 100 of the present invention is useful in a number of applications where data needs to be transferred unilaterally from one processor to another processor using QSPI protocol. Exemplary applications may include, an Internet of Things (IoT) Trail Camera ("Trail Cam"), or an IoT Weather Monitor as further described below. It will be understood that the following illustrative applications are merely examples and not an exhaustive list of possible uses for the present invention.

IoT Trail Cam

Figure 3:
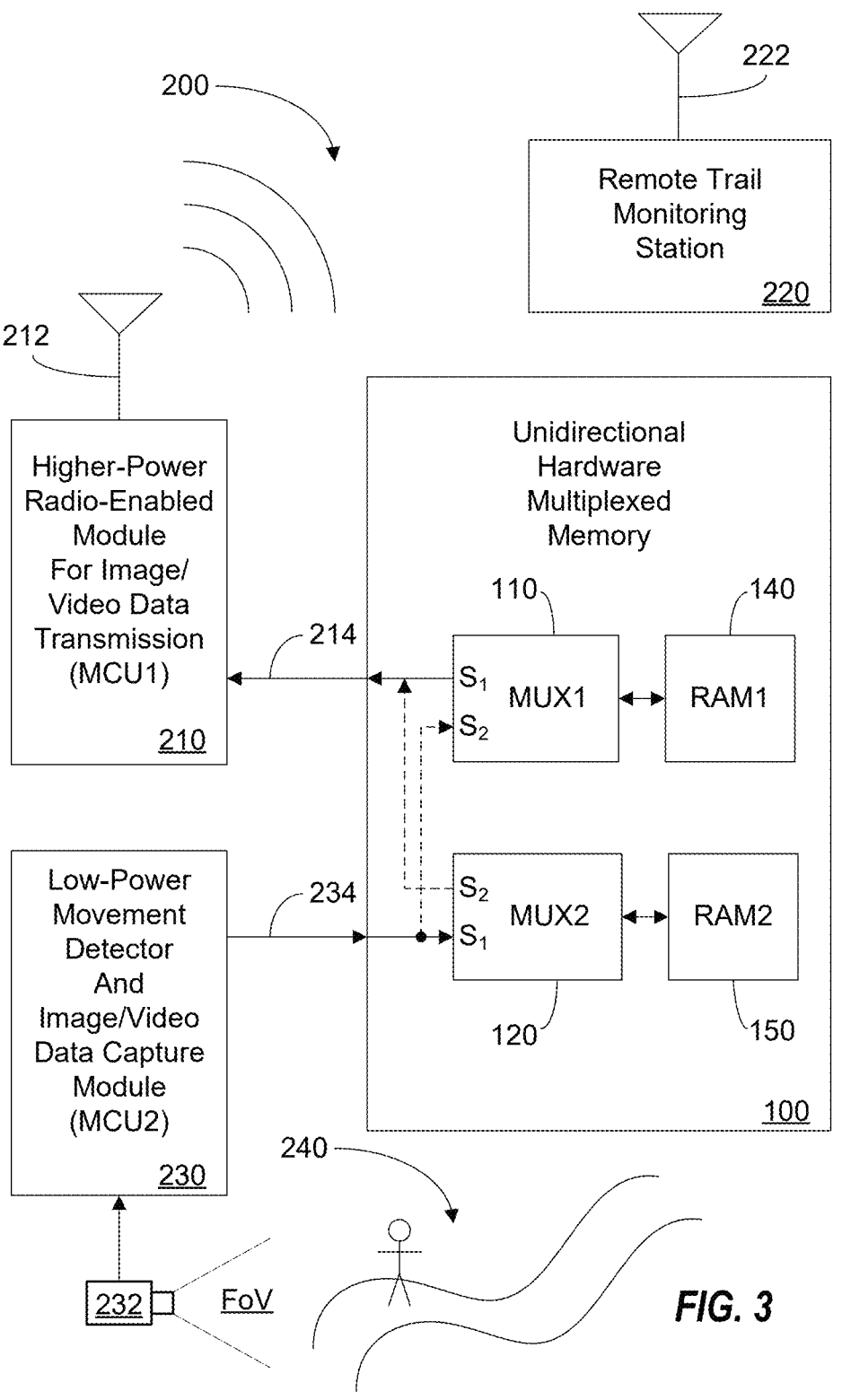
FIG. 3 is a block diagram of an embodiment of a trail cam system including hardware multiplexed memory, according to the present invention.

Transmission of "trail cam" photos (or live video) over a wireless radio to the Internet can be enabled with this invention. FIG. 3 is a block diagram of an embodiment of a trail cam system 200 including an embodiment of hardware multiplexed memory 100, according to the present invention. The trail cam system 200 employs the same underlying architecture as described with reference to the block diagram illustrated in FIG. 1 and related timing diagram shown in FIG. 2.

As illustrated in FIG. 3, the trail cam system 200 may include a QSPI protocol enabled primary microcontroller unit, MCU2 230, incorporated in a low-power movement detector and image capture module 230 with associated camera 232 having a field of view (FoV) along selected wilderness or urban trail 240 that may have occasional human or animal traffic, or any other movement detected that may be of interest to users of system 200. It will be understood that MCU2 230 may be any suitable processor, including the generic processor P2 shown in FIG. 1. MCU2 230 feeds image and/or video data 234 captured by a motion-sensor activated camera 232 to the unilateral hardware multiplexed memory 100. Once MCU2 230 detects movement on the trail 240, it takes a photo or snippet of video 234 and stashes this first data segment in QSPI enabled random access memory (RAM), RAM2 150, via MUX2 120 during a first state, $S_1$.

Trail cam system 200 may further include a QSPI protocol enabled secondary MCU1 210 incorporated into a higher-power radio-enabled module including antenna 212 and configured for wireless image and/or video transmission to a remote trail monitoring station 220 via antenna 222. It will be understood that remote trail monitoring station 222 may in turn be connected to the Internet (not shown) for review, display, analysis, storage, etc., as desired by the end user. It will be further understood that according to various other embodiments, MCU1 210 may be any suitable processor, such as P1 190 as described herein. MCU1 210 may also be in communication with the hardware multiplexed memory 100 to read previously stored image and/or video data 214 (i.e., a previously stored data segment) stored in QSPI enabled RAM1 140 via MUX1 110 within the hardware multiplexed memory 100, during the first state, $S_1$. This simultaneous reading of a prior data segment while writing a first data segment continues until MCU2 is finished writing the first data segment and then initiates a second state, $S_2$, indicated by dashed lines to respective data connections on MUX1 110 and MUX2 120.

During the second state, $S_2$, the memories (RAM1 140 and RAM2 150) get swapped. More particularly, during the second state, $S_2$, the MCU2 230 writes a second segment of captured image and/or video data 234 into RAM1 140 via MUX1 110, while MCU1 210 reads the first data segment from RAM2 150 via MUX2 120 and transmits the photo/video data over its wireless network to a final destination, shown in FIG. 3 as remote trail monitoring station 220. Once MCU2 230 finishes writing the second segment of image and/or video data into RAM1 140 via MUX1 110, MCU2 230 can revert back to the first state, $S_1$, and repeat the data transfer cycle continuously until there is no more trail cam image or video data to capture. It will be understood that the "RAM swapping" via the multiplexers MUX1 110 and MUX2 120 is advantageous as it allows MCU2 230 to take another photo, or gather new video, while the prior stored photo/video is being transmitted by MCU1 210. Another advantageous feature of system 200 is providing for lower power operation than if only the higher-powered MCU1 210 was used for all operations.

According to one embodiment of the trail cam system 200, the first data segment may be a discrete motion detection event captured by MCU2 230 during the first state, $S_1$, and subsequently read by MCU1 210 during the second state, $S_2$, in nearly real time. According to another embodiment of system 200, first time-stamped image or video data may be captured and stored for a first period of time during data segment writing, while prior data may be simultaneously read and transmitted. Upon state change, a second segment of data is written, while the first segment of data is read and transmitted to a user during a subsequent period of time after the first period of time has elapsed. In yet another embodiment of system 200, state switching may be based on a pre-selected level of storage in the memories RAM1 140 and RAM2 150 being written that once reached triggers a change of state to write and read respective memories.

IoT Weather Monitor

Figure 4:
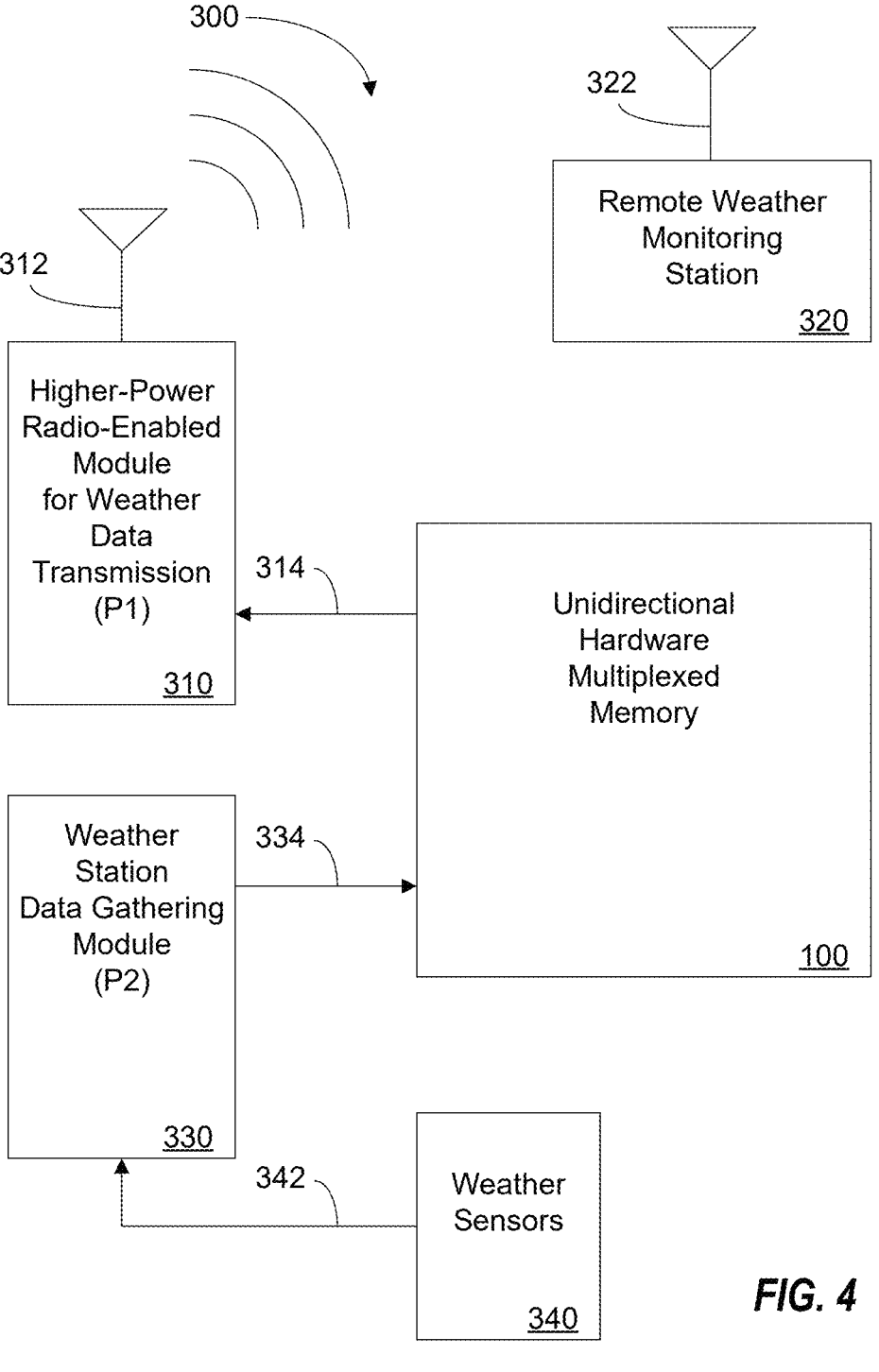
FIG. 4 is a block diagram of an embodiment of a weather monitoring system including hardware multiplexed memory, according to the present invention.

Periodic transmission of remote weather data over a wireless radio and to the Internet for use by one or more users may also be enabled with this invention. FIG. 4 is a block diagram of an embodiment of a weather monitoring system 300 including an embodiment of a hardware multiplexed memory 100, according to the present invention. As illustrated in FIG. 4, the embodiment of system 300 may include weather sensors 340, configured to sense raw weather data 342 from a pre-selected remote location. Weather sensors 340 may be discreet sensors as illustrated, or an integral part of, weather station data gathering module P2 330. P2 330 may be configured to receive the raw weather data, optionally, format or condition the raw weather data into gathered weather data and to write the gathered weather data 334 into the unidirectional hardware multiplexed memory 100. System 300 may further include radio-enabled module 310 with antenna 312 configured for reading weather data 314 from memory 100 and transmitting the weather data wirelessly to a remote weather monitoring station 320. Remote weather monitoring station 320 may include its own antenna 322 and in turn be connected to the Internet for use by any suitable user with Internet access.

Processors P1 310 and P2 330 may be any suitable processors as described herein and may be integrated with other hardware and software to implement its intended purpose. It will be understood that given this disclosure, one of ordinary skill in the art could implement system 300 with any suitable combination of hardware and software without undue experimentation. The weather data gathering performed by P2 330 and weather sensors 340 may be on any suitable schedule. For example, P2 330 may be configured to gather weather data, periodically, e.g., every, hour, minute, or second as desired for a particular application. Additionally, any suitable weather parameters, e.g., ambient temperature, wind speed, humidity, etc., may be sensed or measured by the weather sensors 340.

Operationally, the unidirectional hardware multiplexed memory 100 of the IoT weather monitor 300 operates in the same way as described herein for memories 100 shown in FIGS. 1 and 3 but is shown as a simple block diagram in FIG. 4 for simplicity. For example, during first state, $S_1$, an embodiment of a primary processor P2 330 may be configured to store a first segment of the gathered weather data 334 into memory M2 via multiplexer MUX2, while an embodiment of secondary processor P1 310 simultaneously reads a previously written segment of weather data 314 from memory M1 via multiplexer MUX1, see, e.g., FIG. 1 or FIG. 3 and associated description herein. Once a pre-determined amount of weather data is reached (e.g., 4 MB, 1 day, etc.) and P2 completes writing the first segment of data into M2, P2 initiates a second state, $S_2$. In the state, $S_2$, P2 can write a second segment of weather data into M1 via MUX1, while P1 simultaneously reads the first segment of weather data from M2 via MUX2, again, see FIG. 1 or FIG. 3 and associated description herein.

According to a particular embodiment, P1 310 may be powered off when not in use. P1 310 is configured to transmit the weather data over its network to the remote weather monitoring station 320 via antennas 312 and 322 for remote review, display, analysis, storage, etc., as desired by the end user. This application of the invention allows for very low power data retention over the long time periods required for this application and also allows P2 330 to continue gathering new weather data while P1 310 transmits previously collected weather data.

FIG. 5 is a flowchart of an embodiment of a method 400 for unilaterally transferring data to a secondary processor (P1) from a primary processor (P2), wherein both of the processors, P1 and P2, support data transfer using Quad Serial Peripheral Interface (QSPI) protocol, according to the present invention. The embodiment of a method 400 may include providing 410 a unidirectional hardware multiplexed memory circuit. It will be understood that any of the hardware multiplexed memory circuits 100 described herein may be provided 410, according to embodiments of method 400.

According to a particular embodiment of method 400, the provided unidirectional hardware multiplexed memory circuit may include a first 2-1 multiplexer (MUX1) having first state data input lines in communication with P1 data lines (P1 Data) and second state data input lines, in communication with P2 data lines (P2 Data). According to this particular embodiment of method 400, the provided unidirectional hardware multiplexed memory circuit may further include a second 2-1 multiplexer (MUX2) having first state data input lines in communication with the P2 Data and second state data input lines in communication with the P1 Data. According to this particular embodiment of method 400, the provided unidirectional hardware multiplexed memory circuit may further include a first QSPI memory (M1) having data I/O lines (M1 Data) in communication with MUX1 output data lines. According to this particular embodiment of method 400, the provided unidirectional hardware multiplexed memory circuit may further include a second QSPI memory (M2) having data I/O lines (M2 Data) in communication with MUX2 output data lines. According to this particular embodiment of method 400, the P2 may further include a first general purpose I/O line configured as an enable (EN) output signal in communication with corresponding enable input signals on P1, MUX1 and MUX2. According to this particular embodiment of method 400, the P2 may further include a second general purpose I/O line configured as a chip select (CS) output signal in communication with corresponding chip select input signals on P1, MUX1 and MUX2.

As illustrated in FIG. 5, the embodiment of a method 400 may further include repeating 450 a data transfer sequence, wherein during a first state, $S_1$, the P1 reads pre-first segment data from M1 and P2 writes first segment data to M2. Upon completion of writing the first segment data, P2 initiates a second state, $S_2$, wherein P1 reads the first segment data from M2 and P2 writes second segment data to M1. Upon completion of P2 writing the second segment data, P2 reverting back to the first state, $S_1$, and repeating the data transfer sequence from the first state, $S_1$. Additional description of the step of repeating 450 a data transfer sequence of the method 400 follows with reference to FIG. 6.

Figure 6:
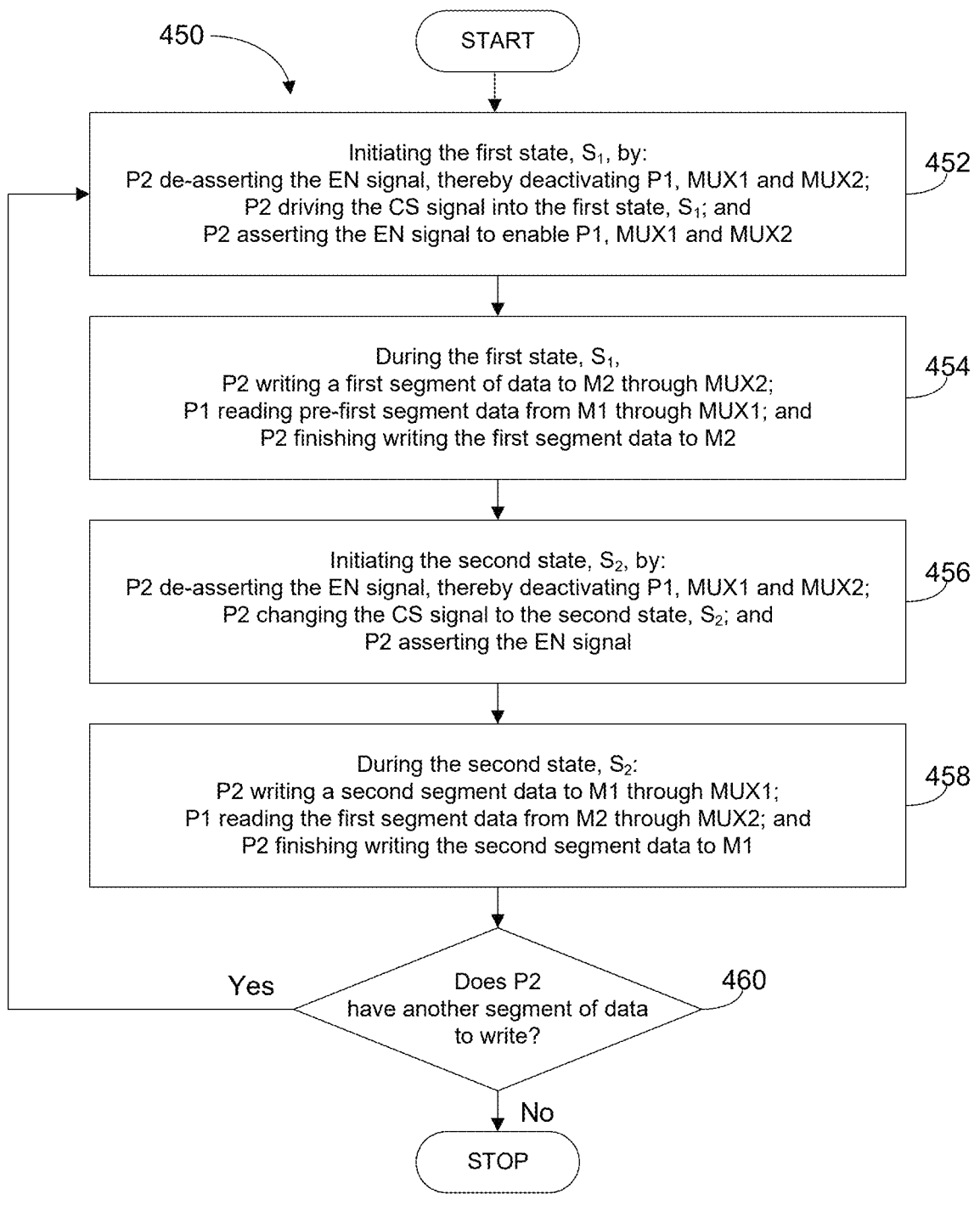
FIG. 6 is a flowchart of an embodiment of repeating a data transfer sequence according to the embodiment of the method for unilaterally transferring data illustrated in FIG. 5, according to the present invention.

FIG. 6 is a flowchart of an embodiment of the repeating 450 a data transfer sequence according to the embodiment of the method 400 for unilaterally transferring data shown in FIG. 5, according to the present invention. The embodiment of the repeating 450 a data transfer sequence according to the embodiment of the method 400 may include initiating the first state, $S_1$. According to this method embodiment, initiating the first state, $S_1$, may include P2 de-asserting the EN signal, thereby deactivating P1, MUX1 and MUX2. According to this method embodiment, initiating the first state, $S_1$, may further include P2 driving the CS signal into the first state, $S_1$. According to this method embodiment, initiating the first state, $S_1$, may further include P2 asserting the EN signal to enable P1, MUX1 and MUX2. According to this method embodiment, and during the first state, $S_1$, P2 may be writing a first segment of data to the M2 through the MUX2, P1 may be reading pre-first segment data from the M1 through the MUX1, and P2 may finish writing the first segment data to the M2. Once the P2 finishes writing the first segment data, P2 proceeds to initiating the second state, $S_2$. According to this method embodiment, initiating the second state, $S_2$, may include P2 de-asserting the EN signal, thereby deactivating P1, MUX1 and MUX2, followed by P2 changing the CS signal to the second state, $S_2$, and finally P2 asserting the EN signal. According to this method embodiment, and during the second state, $S_2$, P2 may be writing a second segment of data to M1 through MUX1. Concurrently, P1 may be reading the first segment data from M2 through MUX2. According to this method embodiment, and upon P2 finishing writing the second segment data to the M1, P2 may initiate the first state, $S_1$, if P2 has another segment of data to write, by repeating the data transfer sequence from the initiating the first state, $S_1$, step.

According to another embodiment, method 400 may further include P1 concurrently transmitting the segments of data (i.e., pre-first segment, first segment, second segment, etc.) to a remote station wirelessly while P1 is reading those same segments of data from M1 and M2. One particular embodiment of this method is illustrated in FIG. 3 where MCU1 210 wirelessly transmits image and/or video data 214 as it is being read from the unidirectional hardware multiplexed memory 100 to the remote trail monitoring station 220. Another embodiment of this method is illustrated in FIG. 4 where P1 310 wirelessly transmits weather data 314 read from the unidirectional hardware multiplexed memory 100 to the remote weather monitoring station 320.

Having described particular embodiments of a hardware multiplexed memory 100, an IoT trail cam system 200 and an IoT weather monitor 300, illustrated in FIGS. 1, 3 and 4, more general embodiments of the present invention are described below.

An embodiment of a circuit for unilaterally transferring data to a secondary processor (P1) from a primary processor (P2), both of the processors, P1 and P2, supporting data transfer using QSPI protocol, wherein the P1 includes four data input/output (I/O) lines (P1 Data) and the P2 also includes four data I/O lines (P2 Data) is disclosed. The embodiment of the circuit may include a first 2-1 multiplexer (MUX1) having first state data input lines in communication with the P1 Data and second state data input lines, in communication with the P2 Data. The embodiment of the circuit may further include a second 2-1 multiplexer (MUX2) having first state data input lines in communication with the P2 Data and second state data input lines in communication with the P1 Data. The embodiment of the circuit may further include a first memory (M1) having data I/O lines (M1 Data) in communication with output data lines, D, of the MUX1. The embodiment of the circuit may further include a second memory (M2) having data I/O lines (M2 Data) in communication with output data lines, D, of the MUX2, wherein both the M1 and the M2 support data transfer using the QSPI protocol.

According to another embodiment of a circuit for unilaterally transferring data to P1 from P2, P2 may further include a first general purpose I/O line configured as an enable (EN) output signal in communication with corresponding enable input signals on P1, MUX1 and MUX2, and wherein P2 further includes a second general purpose I/O line configured as a chip select (CS) output signal in communication with corresponding chip select input signals on P1, MUX1 and MUX2. According to another embodiment, the circuit for unilaterally transferring data to P1 from P2, may be configured for a repeating data transfer sequence. According to this particular embodiment, the repeating data transfer sequence may include P2 initiating a first state, $S_1$, by deactivating P1, MUX1 and MUX2, by de-asserting the EN signal, followed by P2 setting the CS signal in a first state, $S_1$, followed by P2 reasserting the EN signal to reactivate P1, MUX1 and MUX2, thereby allowing P2 to write a first segment of data to the M2 through the MUX2 and the P1 to read pre-first segment data from the M1 through the MUX1 during the first state, $S_1$. Upon P2 finishing writing the first segment data to M2, P2 initiates a second state, $S_2$, by deactivating P1, MUX1 and MUX2, by de-asserting the EN signal, followed by P2 setting the CS signal to the second state, $S_2$, and finally P2 reasserting the EN signal allowing P2 to write second segment data to M1 through MUX1 and allowing P1 to read the first segment data from M2 through MUX2, during the second state, $S_2$. Upon P2 finishing writing the second segment data to M1, P2 may then revert back to the first state, $S_1$, by first deactivating P1, MUX1 and MUX2, by de-asserting the EN signal followed by reverting the CS signal to the first state, $S_1$, and finally asserting the EN signal, thereby repeating the data transfer sequence from the first state, $S_1$.

According to various embodiments of a circuit for unilaterally transferring data to P1 from P2, each of the processors, P1 and P2, may be selected from one of the following types of processors: a microcontroller unit (MCU), a field programmable gate array (FPGA), a complex programmable logic device (CPLD), a central processing unit (CPU), a microprocessor, and an application specific integrated circuit (ASIC). According to yet another embodiment of a circuit for unilaterally transferring data to P1 from P2, each of the multiplexers, MUX1 and MUX2, may be a 6-channel 2-1 multiplexer. According to a more particular embodiment of a circuit for unilaterally transferring data to P1 from P2, the 6-channel 2-1 multiplexers, MUX1 and MUX2, may have part number TS3A27518E.

According to still another embodiment of a circuit for unilaterally transferring data to P1 from P2, each of the first, M1, and the second, M2, QSPI memories may be a QSPI random access memory. According to a more particular embodiment of a circuit for unilaterally transferring data to P1 from P2, each of the first, M1, and the second, M2, QSPI memories may further have part number APS6404L. According to yet still another embodiment of a circuit for unilaterally transferring data to P1 from P2, each of the processors, P1 and P2, are microcontroller units (MCUs) having part number iMXRT1062.

An embodiment of a trail cam system is disclosed. The embodiment of a trail cam system may include a movement detector and image/video capture module (P2) configured for placement at a remote location near a trail and configured for sensing movement within a field of view and capturing images and/or video corresponding to the movement within the field of view. The embodiment of a trail cam system may further include a radio-enabled module (P1) configured for transmitting the captured images and/or the video to a remote trail monitoring station. The embodiment of a trail cam system may further include a circuit for unilaterally transferring data from P2 to P1, wherein both P1 and P2 support data transfer using Quad Serial Peripheral Interface (QSPI) protocol. According to this embodiment, the P1 comprises four data input/output (I/O) lines (P1 Data) and the P2 further comprises four data I/O lines (P2 Data).

According to another embodiment of a trail cam system, the circuit may further include a first 2-1 multiplexer (MUX1) having first state data input lines in communication with the P1 Data and second state data input lines, in communication with the P2 Data. According to this embodiment of a trail cam system, the circuit may further include a second 2-1 multiplexer (MUX2) having first state data input lines in communication with the P2 Data and second state data input lines in communication with the P1 Data. According to this embodiment of a trail cam system, the circuit may further include a first QSPI memory (M1) having data I/O lines (M1 Data) in communication with output data lines of MUX1. According to this embodiment of a trail cam system, the circuit may further include a second QSPI memory (M2) having data I/O lines (M2 Data) in communication with output data lines of MUX2. According to yet another embodiment of a trail cam system, the P2 may further include a first general purpose I/O line configured as an enable (EN) output signal in communication with corresponding enable input signals on the P1, the MUX1 and the MUX2. According to this embodiment, the P2 may further include a second general purpose I/O line configured as a chip select (CS) output signal in communication with corresponding chip select input signals on the P1, the MUX1 and the MUX2.

According to one embodiment, the trail cam system may be configured for repeating an image/video data transfer sequence. According to a particular embodiment, the image/video data transfer sequence may include the P2 initiating a first state, $S_1$, by initially de-asserting the EN signal to deactivate P1, MUX1 and MUX2, followed by P2 setting the CS signal in first state, $S_1$. Then P2 asserts the EN signal to activate P1, MUX1 and MUX2, thereby allowing the P2 to write a first segment of image and/or video data to the M2 through the MUX2. Simultaneously, P1 is allowed to read previously written, pre-first segment image and/or video data from M1 through MUX1. According to this embodiment, when P2 finishes writing the first segment of image and/or video data to M2, P2 initiates a second state, $S_2$, by first deactivating P1, MUX1 and MUX2 by de-asserting the EN signal. P2 then sets the CS signal to the second state, $S_2$, and finally reasserts the EN signal to allow P2 to write a second segment of image and/or video data to M1 through MUX1, and simultaneously, P1 is allowed to read the first segment of image and/or video data from M2 through MUX2. According to this embodiment, when P2 finishes writing the second segment of image and/or video data to M1, P1 reverts to the first state, $S_1$, by first deactivating P1, MUX1 and MUX2 by de-asserting the EN signal, followed by setting the CS signal back to the first state, $S_1$, and finally by P2 asserting the EN signal thereby activating P1, MUX1 and MUX2. According to various embodiments, the trail cam system repeats the image/video data transfer sequence from the first state, $S_1$, continuously or until there is no more image/video data sensed by P2.

An embodiment of a remote weather monitoring system is disclosed. The embodiment of a remote weather monitoring system may include a weather station data gathering module (P2) including weather sensors configured for placement at a preselected location and configured for periodically gathering weather data sensed at the preselected location. The embodiment of a remote weather monitoring system may further include a radio-enabled module (P1) configured for transmitting the weather data to a remote weather monitoring station. The embodiment of a remote weather monitoring system may further include a circuit for unilaterally transferring the weather data from P2 to P1, wherein both P1 and P2 support data transfer using Quad Serial Peripheral Interface (QSPI) protocol. According to this embodiment, the P1 may further include four data input/output (I/O) lines (P1 Data) and the P2 may further include four data I/O lines (P2 Data).

According to another embodiment of a remote weather monitoring system, the circuit may further include a first 2-1 multiplexer (MUX1) having first state data input lines in communication with the P1 Data and second state data input lines, in communication with the P2 Data. According to this embodiment of a remote weather monitoring system, the circuit may further include a second 2-1 multiplexer (MUX2) having first state data input lines in communication with the P2 Data and second state data input lines in communication with the P1 Data. According to this embodiment of a remote weather monitoring system, the circuit may further include a first QSPI memory (M1) having data I/O lines (M1 Data) in communication with output data lines of the MUX1. According to this embodiment of a remote weather monitoring system, the circuit may further include a second QSPI memory (M2) having data I/O lines (M2 Data) in communication with output data lines of the MUX2.

According to one embodiment of a remote weather monitoring system, P2 may further include a first general purpose I/O line configured as an enable (EN) output signal in communication with corresponding enable input signals on P1, MUX1 and MUX2. According to this embodiment, P2 may further include a second general purpose I/O line configured as a chip select (CS) output signal in communication with corresponding chip select input signals on P1, MUX1 and MUX2.

According to yet another embodiment, the remote weather monitoring system may be configured for repeating a weather data transfer sequence. According to this embodiment, the weather data transfer sequence may include P2 initiating a first state, $S_1$, first by P2 de-asserting the EN signal to deactivate P1, MUX1 and MUX2, followed by P2 setting the CS signal in first state, $S_1$, and finally by P2 asserting the EN signal to activate P1, MUX1 and MUX2. According to this embodiment and in the first state, $S_1$, P2 is allowed to write a first segment of weather data to M2 through MUX2 and simultaneously, P1 is allowed to read pre-first segment weather data from M1 through MUX1. According to this embodiment, when P2 finishes writing the first segment of weather data to M2, P2 initiates a second state, $S_2$, first deactivating P1, MUX1 and MUX2 by de-asserting the EN signal, followed by P2 changing the CS signal to a second state, $S_2$, and finally P2 asserting the EN signal to allow P2 to write a second segment of weather data to M1 through MUX1 and simultaneously P1 to read the first segment of weather data from M2 through MUX2. According to this embodiment, when P2 finishes writing the second segment of weather data to M1, P1 reverts back to the first state, $S_1$, first deactivating P1, MUX1 and MUX2 by de-asserting the EN signal, followed by P2 reverting the CS signal back to the first state, $S_1$, and finally reactivating P1, MUX1 and MUX2 by asserting the EN signal, thereby repeating the weather data transfer sequence from the first state, $S_1$.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the result is not significantly changed.

From the description of the embodiments of hardware multiplexed memory for unidirectional data transfer circuits, systems and methods described herein, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A circuit for unilaterally transferring data to a secondary processor (P1) from a primary processor (P2), both of the processors, P1 and P2, supporting data transfer using Quad Serial Peripheral Interface (QSPI) protocol, wherein the P1 includes four data input/output (I/O) lines (P1 Data) and the P2 also includes four data I/O lines (P2 Data), the circuit comprising:

a first 2-1 multiplexer (MUX1) having first state data input lines in communication with the P1 Data and second state data input lines, in communication with the P2 Data;

a second 2-1 multiplexer (MUX2) having first state data input lines in communication with the P2 Data and second state data input lines in communication with the P1 Data;

a first memory (M1) having data I/O lines (M1 Data) in communication with output data lines of the MUX1;

a second memory (M2) having data I/O lines (M2 Data) in communication with output data lines of the MUX2, wherein the M1 and the M2 also support data transfer using the QSPI protocol; and the circuit further configured for a repeating data transfer sequence wherein the P2 initiates a first state, $S_1$, by deactivating the P1, the MUX1 and the MUX2, by de-asserting the EN signal, followed by the P2 setting the CS signal in a first state, $S_1$, followed by the P2 asserting the EN signal to reactivate the P1, the MUX1 and the MUX2, thereby allowing P2 to write a first segment of data to the M2 through the MUX2 and the P1 to read pre-first segment data from the M1 through the MUX1, upon the P2 finishing writing the first segment data to the M2, the P2 initiates a second state, $S_2$, by deactivating the P1, the MUX1 and the MUX2, by de-asserting the EN signal, followed by the P2 setting the CS signal to the second state, $S_2$, and finally the P2 asserting the EN signal allowing the P2 to write second segment data to the M1 through the MUX1 and allowing the P1 to read the first segment data from the M2 through the MUX2, and upon the P2 finishing writing the second segment data to the M1, the P1 reverts to the first state, $S_1$, by first deactivating the P1, the MUX1 and the MUX2, by de-asserting the EN signal followed by reverting the CS signal to the first state, $S_1$, and finally asserting the EN signal, thereby repeating the data transfer sequence from the first state, $S_1$.

2. The circuit according to claim 1, wherein the P2 further includes a first general purpose I/O line configured as an enable (EN) output signal in communication with corresponding enable input signals on the P1, the MUX1 and the MUX2, and wherein the P2 further includes a second general purpose I/O line configured as a chip select (CS) output signal in communication with corresponding chip select input signals on the P1, the MUX1 and the MUX2.

3. The circuit according to claim 1, wherein each of the processors, P1 and P2, are selected from the group consisting of: a microcontroller unit (MCU), a field programmable gate array (FPGA), a complex programmable logic device (CPLD), a central processing unit (CPU), a microprocessor, and an application specific integrated circuit (ASIC).

4. The circuit according to claim 1, wherein each of the multiplexers, MUX1 and MUX2, comprise a 6-channel 2-1 multiplexer.

5. The circuit according to claim 4, wherein the 6-channel 2-1 multiplexers, MUX1 and MUX2, further comprises part number TS3A27518E.

6. The circuit according to claim 1, wherein each of the first, M1, and the second, M2, QSPI memories comprise QSPI random access memory.

7. The circuit according to claim 6, wherein each of the first, M1, and the second, M2, QSPI memories further comprise part number APS6404L.

8. The circuit according to claim 1, wherein each of the processors, P1 and P2, are microcontroller units (MCUs) having part number iMXRT1062.

9. A trail cam system, comprising:

a movement detector and image/video capture module (P2) configured for placement at a remote location near a trail, and configured for sensing movement within a field of view and capturing images and/or video corresponding to the movement within the field of view;

a radio-enabled module (P1) configured for transmitting the captured images and/or the captured video to a remote trail monitoring station;

a circuit for unilaterally transferring data from the P2 to the P1, wherein both the P1 and the P2 support data transfer using Quad Serial Peripheral Interface (QSPI) protocol, the P1 comprises four data input/output (I/O) lines (P1 Data) and the P2 further comprises four data I/O lines (P2 Data); and the trail cam system further configured for repeating an image/video data transfer sequence wherein the P2 initiates a first state, $S_1$, by initially de-asserting the EN signal to deactivate the P1, the MUX1 and the MUX2, followed by the P2 setting the CS signal in the first state, $S_1$, finally the P2 asserting the EN signal to activate the P1, the MUX1 and the MUX2, thereby allowing the P2 to write a first segment of image and/or video data to the M2 through the MUX2 and the P1 to read previously written, pre-first segment image and/or video data from the M1 through the MUX1, wherein upon the P2 finishing writing the first segment of image and/or video data to the M2, the P2 initiates a second state, $S_2$, by first deactivating the P1, the MUX1 and the MUX2 by de-asserting the EN signal followed by setting the CS signal to the second state, $S_2$, and finally asserting the EN signal to allow the P2 to write a second segment of image and/or video data to the M1 through the MUX1, and the P1 to read the first segment of image and/or video data from the M2 through the MUX2, and wherein upon the P2 finishing writing the second segment of image and/or video data to the M1, the P1 reverts to the first state, $S_1$, by first deactivating the P1, the MUX1 and the MUX2 by de-asserting the EN signal followed by setting the CS signal back to the first state, $S_1$, and finally asserting the EN signal thereby activating the P1, the MUX1 and the MUX2, thereby repeating the image/video data transfer sequence from the first state, $S_1$.

10. The trail cam system according to claim 9, wherein the circuit further comprises:

a first 2-1 multiplexer (MUX2) having first state data input lines in communication with the P1 Data and second state data input lines, in communication with the P2 Data;

a second 2-1 multiplexer (MUX2) having first state data input lines in communication with the P2 Data and second state data input lines in communication with the P1 Data;

a first QSPI memory (M1) having data I/O lines (M1 Data) in communication with output data lines of the MUX1; and a second QSPI memory (M2) having data I/O lines (M2 Data) in communication with output data lines of the MUX2.

11. The trail cam system according to claim 10, wherein the P2 further includes a first general purpose I/O line configured as an enable (EN) output signal in communication with corresponding enable input signals on the P1, the MUX1 and the MUX2, and wherein the P2 further includes a second general purpose I/O line configured as a chip select (CS) output signal in communication with corresponding chip select input signals on the P1, the MUX1 and the MUX2.

12. A remote weather monitoring system, comprising:

a weather station data gathering module (P2) comprising weather sensors configured for placement at a preselected location, and configured for periodically gathering weather data sensed at the preselected location;

a radio-enabled module (P1) configured for transmitting the weather data to a remote weather monitoring station;

a circuit for unilaterally transferring the weather data from the P2 to the P1, wherein both the P1 and the P2 support data transfer using Quad Serial Peripheral Interface (QSPI) protocol, the P1 comprises four data input/output (I/O) lines (P1 Data) and the P2 further comprises four data I/O lines (P2 Data); and the remote weather monitoring system further configured for repeating a weather data transfer sequence wherein the P2 initiates a first state, $S_1$, first by the P2 de-asserting the EN signal to deactivate the P1, the MUX1 and the MUX2, followed by the P2 setting the CS signal in first state, $S_1$, and finally by the P2 asserting the EN signal to activate the P1, the MUX1 and the MUX2, allowing the P2 to write a first segment of weather data to the M2 through the MUX2 and the P1 to read pre-first segment weather data from the M1 through the MUX1, wherein upon the P2 finishing writing the first segment of weather data to the M2, the P2 initiates a second state, $S_2$, first deactivating the P1, the MUX1 and the MUX2 by de-asserting the EN signal, followed by the P2 changing the CS signal to a second state, $S_2$, and finally the P2 asserting the EN signal to allow the P2 to write a second segment of weather data to the M1 through the MUX1 and the P1 to read the first segment of weather data from the M2 through the MUX2, wherein upon the P2 finishing writing the second segment of weather data to the M1, the P1 reverting back to the first state, $S_1$, by first deactivating the P1, the MUX1 and the MUX2 by de-asserting the EN signal followed by the P2 reverting the CS signal back to the first state, $S_1$, and finally reactivating the P1, the MUX1 and the MUX2 by asserting the EN signal, thereby repeating the weather data transfer sequence from the first state, $S_1$.

13. The remote weather monitoring system according to claim 12, wherein the circuit further comprises:

a first 2-1 multiplexer (MUX1) having first state data input lines in communication with the P1 Data and second state data input lines, in communication with the P2 Data;

a second 2-1 multiplexer (MUX2) having first state data input lines in communication with the P2 Data and second state data input lines in communication with the P1 Data;

a first QSPI memory (M1) having data I/O lines (M1 Data) in communication with output data lines of the MUX1; and a second QSPI memory (M2) having data I/O lines (M2 Data) in communication with output data lines of the MUX2.

14. The remote weather monitoring system according to claim 13, wherein the P2 further includes a first general purpose I/O line configured as an enable (EN) output signal in communication with corresponding enable input signals on the P1, the MUX1 and the MUX2, and wherein the P2 further includes a second general purpose I/O line configured as a chip select (CS) output signal in communication with corresponding chip select input signals on the P1, the MUX1 and the MUX2.

15. A method for unilaterally transferring data to a secondary processor (P1) from a primary processor (P2), wherein both of the processors, P1 and P2, support data transfer using Quad Serial Peripheral Interface (QSPI) protocol, the method comprising:

providing a unidirectional hardware multiplexed memory circuit, comprising:

a first 2-1 multiplexer (MUX1) having first state data input lines in communication with P1 data lines (P1 Data) and second state data input lines, in communication with P2 data lines (P2 Data);

a second 2-1 multiplexer (MUX2) having first state data input lines in communication with the P2 Data and second state data input lines in communication with the P1 Data;

a first QSPI memory (M1) having data I/O lines (M1 Data) in communication with MUX1 output data lines;

a second QSPI memory (M2) having data I/O lines (M2 Data) in communication with MUX2 output data lines;

wherein the P2 further comprises a first general purpose I/O line configured as an enable (EN) output signal in communication with corresponding enable input signals on the P1, the MUX1 and the MUX2; and wherein the P2 further includes a second general purpose I/O line configured as a chip select (CS) output signal in communication with corresponding chip select input signals on the P1, the MUX1 and the MUX2;

repeating a data transfer sequence, wherein during a first state, $S_1$, the P1 reads pre-first segment data from the M1 and the P2 writes first segment data to the M2, upon the P2 completing writing the first segment data, P2 initiating a second state, $S_2$, during which the P1 reads the first segment data from the M2 and the P2 writes second segment data to the M1, upon completion of the P2 writing the second segment data, reverting back to the first state, $S_1$, and repeats the data transfer sequence from the first state, $S_1$; and initiating the first state, $S_1$, by:

the P2 de-asserting the EN signal, thereby deactivating the P1, the MUX1 and the MUX2;

the P2 driving the CS signal into the first state, $S_1$; and the P2 asserting the EN signal to enable the P1, the MUX1 and the MUX2;

during the first state, $S_1$:

the P2 writing a first segment of data to the M2 through the MUX2;

the P1 reading pre-first segment data from the M1 through the MUX1; and the P2 finishing writing the first segment data to the M2;

initiating the second state, $S_2$, by:

the P2 de-asserting the EN signal, thereby deactivating the P1, the MUX1 and the MUX2;

the P2 changing the CS signal to the second state, $S_2$; and the P2 asserting the EN signal;

during the second state, $S_2$:

the P2 writing a second segment data to the M1 through the MUX1;

the P2 reading the first segment data from the M2 through the MUX2; and the P2 finishing writing the second segment data to the M1; and if the P2 has another segment of data to write, repeating the data transfer sequence from the initiating the first state, $S_1$.

16. The method according to claim 15, further comprising the P1 concurrently transmitting the segments of data to a remote station wirelessly while the P1 is reading the segments of data from the M1 and the M2.

\* \* \* \* \*